US012192759B2

(12) United States Patent
Nicoara et al.

(10) Patent No.: US 12,192,759 B2
(45) Date of Patent: Jan. 7, 2025

(54) FIFTH GENERATION (5G) AUTHENTICATION AND KEY AGREEMENT USER EQUIPMENT AUTHENTICATION

(71) Applicant: Cisco Technology, Inc., San Jose, CA (US)

(72) Inventors: Eugen Octavian Nicoara, Highlands Ranch, CO (US); Nam Kim, Dunwoody, GA (US)

(73) Assignee: Cisco Technology, Inc.

( * ) Notice: Subject to any disclaimer, the term of this patent is extended or adjusted under 35 U.S.C. 154(b) by 237 days.

(21) Appl. No.: 17/814,406

(22) Filed: Jul. 22, 2022

(65) Prior Publication Data
US 2024/0031804 A1  Jan. 25, 2024

(51) Int. Cl.
*H04W 12/06* (2021.01)
*H04W 12/0431* (2021.01)

(52) U.S. Cl.
CPC ....... *H04W 12/06* (2013.01); *H04W 12/0431* (2021.01)

(58) Field of Classification Search
CPC .......................... H04W 12/06; H04W 12/0431
See application file for complete search history.

(56) References Cited

U.S. PATENT DOCUMENTS 11,202,255 B1  12/2021  Shaw
2020/0153830 A1  5/2020  Li et al.

FOREIGN PATENT DOCUMENTS

WO   2020007461 A1   1/2020
WO   2021209379 A1   10/2021
WO   2022027505 A1   2/2022

OTHER PUBLICATIONS

ETSI, "Non-Access-Stratum (NAS) protocol for 5G System (5GS); Stage 3, 3GPP TS 24.501 version 16.5.1 Release 16", Aug. 2020 (Year: 2020).*
ETSI, "Security architecture and procedures for 5G System, 3GPP TS 33.501 version 16.4.0 Release 16", Nov. 2020 (Year: 2020).*

* cited by examiner

Primary Examiner — Ryan J Jakovac
(74) Attorney, Agent, or Firm — Merchant & Gould P.C.

(57) ABSTRACT

Providing 5G-AKA User Equipment (UE) authentication and, more specifically, providing 5G-AKA UE authentication at an edge of a network may be provided. An Authentication Server Function (AUSF) at an edge of a network, and the AUSF may request an Authentication Vector (AV) from a Unified Data Management (UDM). The AUSF may receive AV from the UDM and cache the AV at an AV cache. An authentication request may be received from an Access and Mobility Management Function (AMF) and the AV from the AV cache may be provided to the AMF.

15 Claims, 11 Drawing Sheets

FIFTH GENERATION (5G) AUTHENTICATION AND KEY AGREEMENT USER EQUIPMENT AUTHENTICATION

TECHNICAL FIELD

The present disclosure relates generally for providing Fifth Generation (5G) Authentication and Key Agreement (5G-AKA) User Equipment (UE) authentication and more specifically to providing 5G-AKA UE authentication at an edge of a network.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Providing 5G-AKA User Equipment (UE) authentication and, more specifically, providing 5G-AKA UE authentication at an edge of a network may be provided. An Authentication Server Function (AUSF) at an edge of a network, and the AUSF may request an Authentication Vector (AV) from a Unified Data Management (UDM). The AUSF may receive AV from the UDM and cache the AV at an AV cache. An authentication request may be received from an Access and Mobility Management Function (AMF) and the AV from the AV cache may be provided to the AMF.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In a Fifth Generation (5G) network, an Authentication Server Function (AUSF), a Unified Data Management (UDM), and a User Data Repository (UDR) may be deployed on servers that are accessed over a network, commonly referred to as the cloud. An Access and Mobility Management Function (AMF), a Session Management Function (SMF), and a User Plane Function (UPF) may be deployed on edge of the network. The network may have multiple edges that may each have an AMF, an SMF, and a UPF. The components at the edges of the network may communicate with the components of the cloud via the network. However, the edges may not always be able to connect to the components of the cloud for various reasons, such as network outages. When the components at the edges of the cloud cannot communicate with the components of the cloud, User Equipment (UE) authentication requests may fail, for example because the AMF cannot obtain Authentication Vectors (AV).

Figure 1:
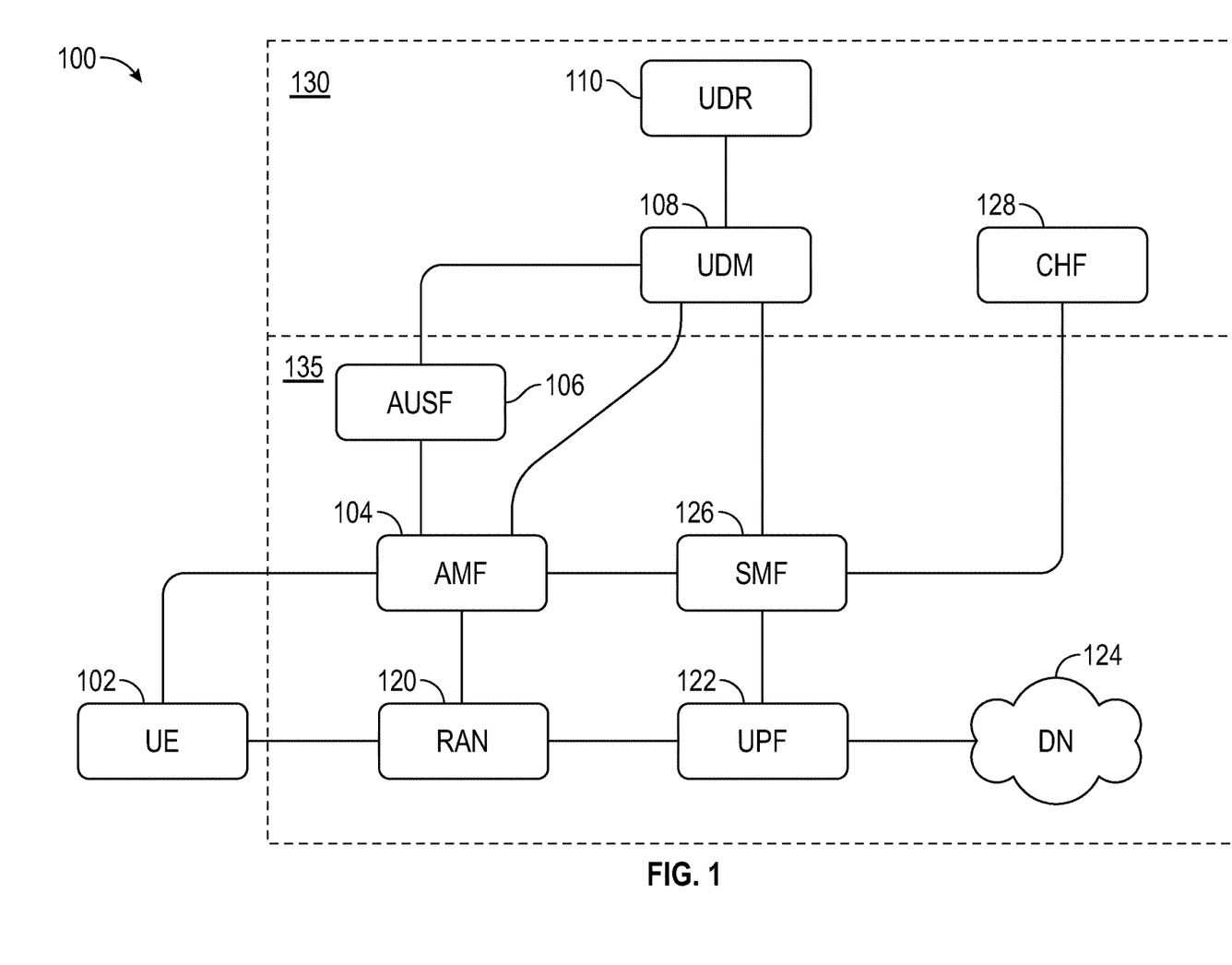
FIG. 1 is a block diagram of an operating environment for providing 5G-AKA User Equipment authentication.

FIG. 1 is a block diagram of an operating environment 100 for providing 5G-AKA UE authentication. The operating environment 100 includes a UDM 108, a UDR 110, and a Charging Function (CHF) 128 located in the cloud 130 of a network. The cloud 130 may be a location remote from an edge 135 of the network. The edge 135 may be a location in close proximity to users of the network. The network may include multiple edges, including edge 135. The operating environment 100 may also include an AMF 104, and AUSF 106, a Radio Access Network (RAN) 120, a UPF 122, a Data Network (DN) 124, and an SMF 126 located at the edge 135. The operating environment may also include a UE 102. The UE 102 may have an associated International Mobile Subscriber Identity (IMSI) that may enable the components of the operating environment 100 to identify the UE 102 and/or the Subscriber Identification Module (SIM) card present in the UE 102.

The AUSF 106 may be located on the edge 135 to enable 5G-AKA UE authentication when the cloud 130 and its components, such as the UDM 108, the UDR, and the CHF 128, are inaccessible. The AUSF 106 may store AVs generated by the UDM 108 in a cache to enable 5G-AKA UE authentication without the AUSF 106 needing to retrieve an AV from the UDM 108. Thus, the AV may be available for 5G-AKA UE authentication even if the cloud 130 and its components are inaccessible or otherwise unavailable to the edge 135 and its components.

The UE 102 access the network by communicating with components located at the edge 135, such as the RAN 120 and/or the AMF 104. The UE 102 may be in close proximity to the location of the edge 135. In some examples, the UE 102 may move locations and connect to an edge of the network that is closer to the UE 102 than the edge 135. The closer edge may have the same or similar components as the components of the edge 135.

Figure 2:
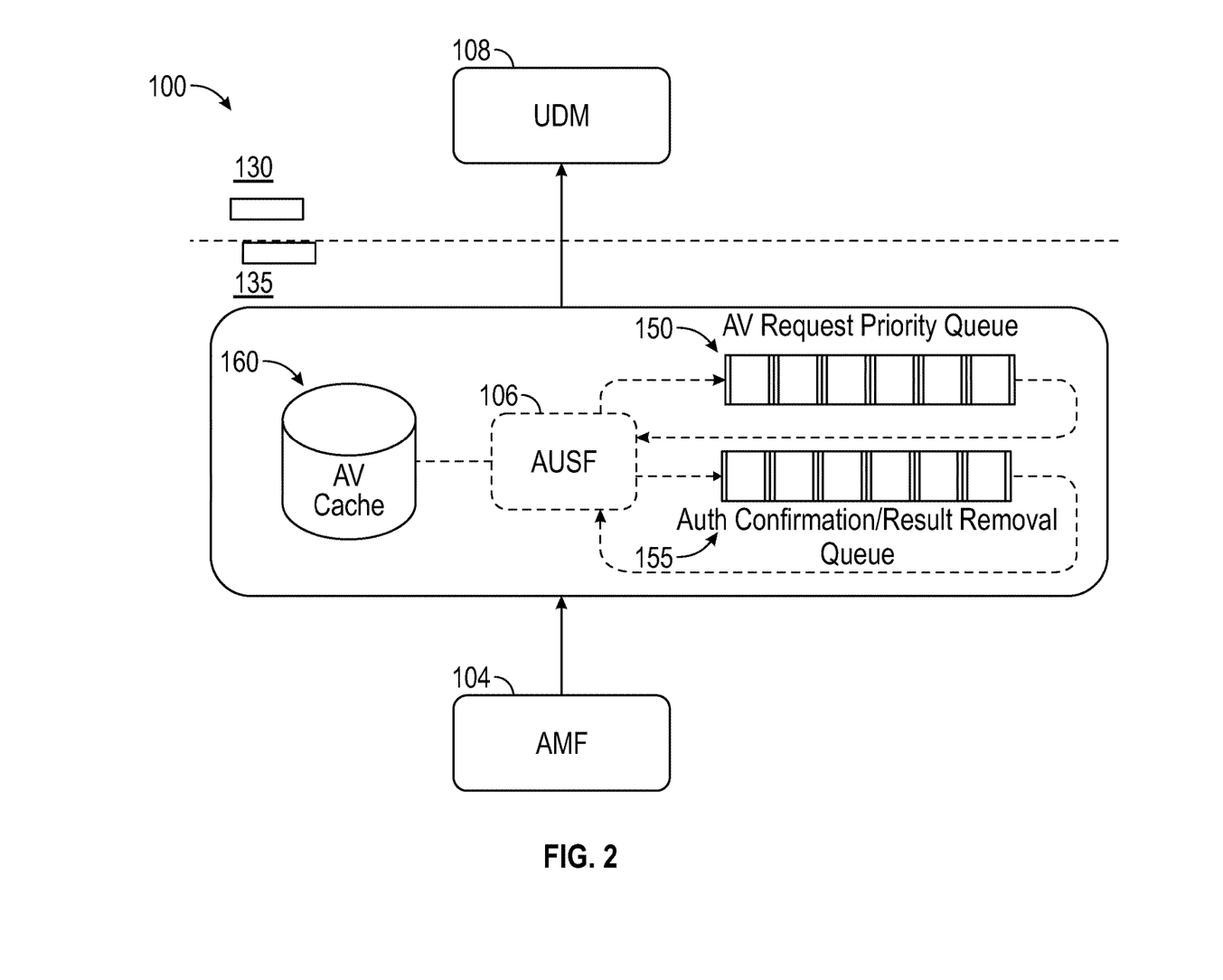
FIG. 2 is a block diagram of an operating environment of an Authentication Server Function (AUSF) for providing 5G-AKA User Equipment authentication.

FIG. 2 is a block diagram of the operating environment 100 of the AUSF 106 for providing 5G-AKA UE authentication. The operating environment may include an AV request queue 150, an authorization confirmation and result removal queue 155, and an AV cache 160.

The AUSF 106 may receive AVs from the UDM 108 and store the AVs in the AV cache 160. Thus, the AVs may be subsequently accessed at the edge 135 without communicating with the cloud 130. The AV cache 160 may maintain a first in, first out (FIFO) cache that can store multiple AVs for each UE, such as UE 102. Each UE may be identified by its respective IMSI.

The AUSF 106 may request the UDM 108 to send AVs to the AUSF 106 by adding an AV request to the AV request queue 150. The AV request queue 150 may assign a priority to AV requests based on the number of AVs stored in the AV cache 160 for the given UE or associated IMSI at the time the request is added to the queue. For example, a request for a UE having two associated AVs stored in the AV cache 160 will be assigned a higher priority than a request for a UE having five associated AVs stored in the AV cache 160. If an AV request fails, such as because the components of the cloud 130 are inaccessible by the components of the edge 135, the AUSF 106 may re-add the failed request. The re-added AV request may be assigned the same priority that it was assigned when it was initially added or assigned a new priority based on the number of AVs of the IMSI associated with the request stored in the AV cache 160 and the number of AVs of the other IMSIs associated with other UEs stored in the AV cache 160. Thus, the re-added AV request may be sent to the UDM 108, such as by the AUSF 106, at the same spot in the queue as it was originally intended to be sent or adjusted based on evaluating the present state of the AV cache 160.

The AUSF 106 may request the UDM to send authentication confirmations or perform authentication result removal by adding authentication confirmation requests and/or authentication result removal requests to the authorization confirmation and result removal queue 155. The requests added to the authorization confirmation and result removal queue 155 may be assigned a priority equal to a timestamp indicating the time of the initial addition to the queue. If the request fails and the AUSF 106 re-adds the request to the authorization confirmation and result removal queue 155, the re-added request may have the same priority based on the timestamp of the request's initial addition to the authorization confirmation and result removal queue 155. Thus, the re-added request may not lose its spot in the queue.

The requests in the AV request queue 150 and the authorization confirmation and result removal queue 155 may be sent when the edge 135 is able to connect to the cloud 130. When the edge 135 cannot connect to the cloud 130, the requests may be stored in the queue until a connection is made.

The AMF 104 may trigger authentication procedures by requesting the AUSF 106 to send an AV associated with a UE. The AUSF 106 may retrieve the AV from the FIFO cache associated with the UE, which may be identified using the IMSI of the UE. The AUSF 106 may then send the AV to the AMF 104. The AUSF 106 may use a Subscription Permanent Identifier (SUPI) allocated to subscribers of the network, such as the UE 102, for local processing of requests and/or AVs and for storage of the AVs in the AV cache 160. The SUPI may be the IMSI of the UE and/or a Network Access Identifier (NAI). The AUSF 106 may also use a Subscriber Concealed Identifier (SUCI) allocated to subscribers of the network, such as the UE 102. When the UE 102 uses a SUCI instead of a SUPI for the AMF 104 to trigger the authentication procedure, the AUSF 106 may use a provisioned SUCI private key to decrypt the SUCI to a SUPI and lookup the AVs stored in the AV cache 160 associated with the UE of the authentication request from the AMF 104 by using the IMSI. The SUCI private key may be provided by a SIM manufacturer.

The AV associated with an authentication procedure triggered by the AMF 104 may be retrieved from the AV cache 160 whenever the AV cache stores the AV. Thus, even though the UDM 108 may not be able to provide the AV if the cloud 130 is inaccessible, the AUSF 106 may send the AV since it is stored in the AV cache 160. The AUSF 106 may retrieve AVs from the AV cache 160 in response to authentication procedures even if the UDM 108 and the cloud 130 are accessible.

When the authentication has been successfully completed, the AMF 104 may send a confirmation to the AUSF 106. The AUSF 106 may then queue an authentication confirmation request to the UDM 108 for the AV by adding the request to the authentication confirmation and result removal queue 155. The AUSF 106 may also request a new AV associated with the UE from the UDM 108 by adding an AV request to the AV request queue 150.

Figure 3:
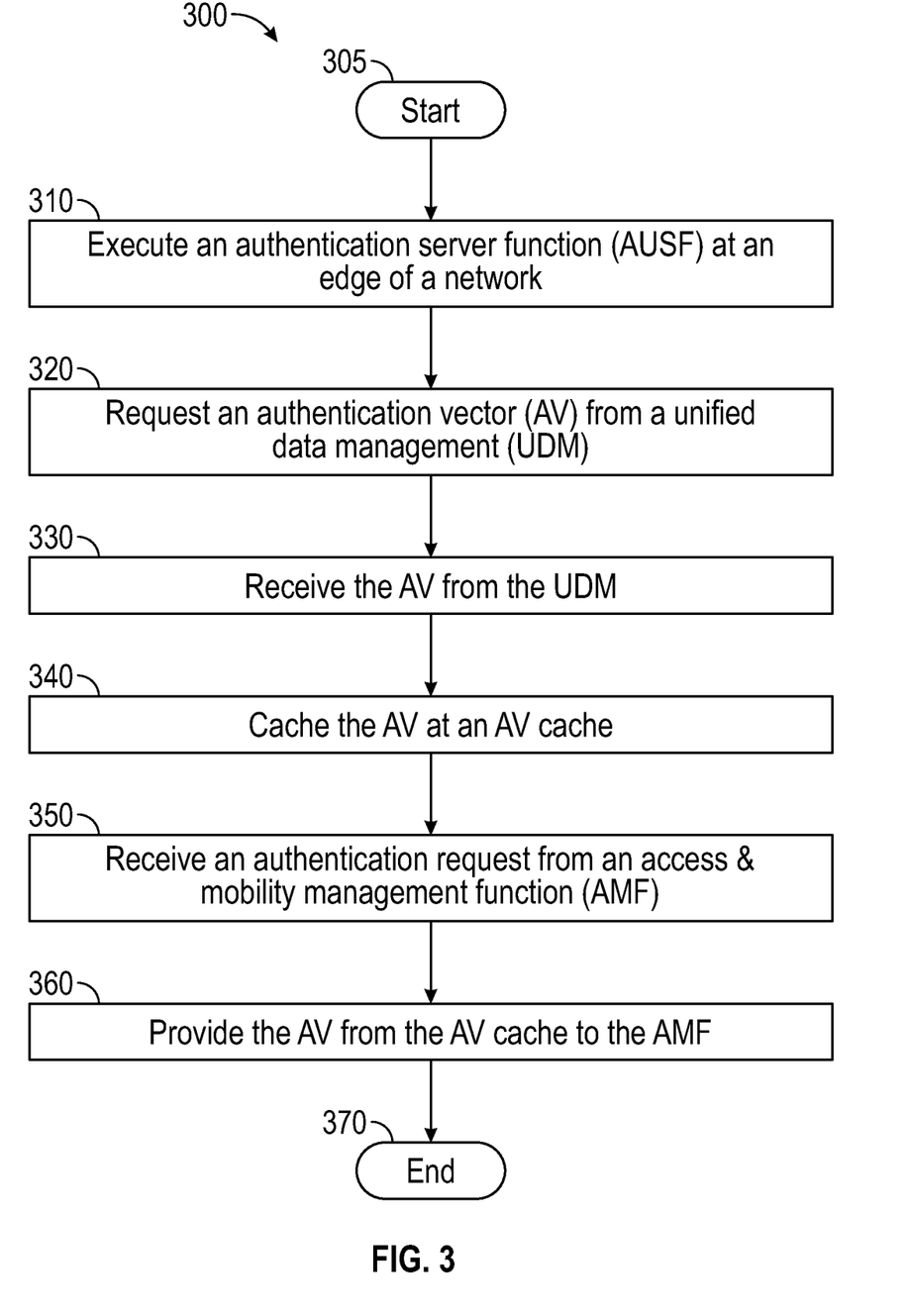
FIG. 3A is a flow chart of a method for providing 5G-AKA User Equipment authentication.
FIG. 3B is a flow chart of a method for providing 5G-AKA User Equipment authentication including evaluating an Authentication Vector cache.

FIG. 3A is a flow chart of a method 300 for providing 5G-AKA UE authentication. The operations shown in FIG. 3A may be for a subscriber that is initially subscribing to the network, and the subscriber does not have any associated AVs stored in an AV cache. The operations shown in FIG. 3A may also be for a subscriber after the AV cache has been flushed, and the subscriber does not have any associated AVs stored in an AV cache.

The method 300 may begin at starting block 305 and proceed to operation 310, where an AUSF is executed at an edge of a network. For example, the AUSF 106 shown in FIG. 1 and FIG. 2 may be executed at the edge 135 of the network. In operation 315, an AV is requested from a UDM.

For example, the AUSF 106 may receive an authentication request from the AMF 104. The associated subscriber may be initially connecting to the network and/or the AV cache 160 may have been flushed, so the AV cache 160 does not have any stored AVs associated with the subscriber. In response, the AUSF 106 may request the AV from the UDM 108 or add an AV request to the AV request queue 150. The AV request may be sent to the UDM 108, such as by AUSF 106, when the edge 135 can connect to the cloud 130 for example.

An AV may be received from the UDM in operation 320. For example, the AUSF 106 may receive the AV sent by the UDM 108 in response to the AV request sent in operation 320. In operation 325, the AV may be cached at an AV cache. For example, the AUSF 106 causes the AV to be cached at the AV cache 160. In some examples, multiple AVs may be stored in the AV cache 160. Therefore, operations 315, 320, and 325 may repeat as many times as necessary to populate the AV cache 160 with the desired number of AVs.

In operation 330, an authentication request from an AMF is received. For example, the AMF 104 may send an authentication request to the AUSF 106. In operation 335, the AV from the AV cache is provided to the AMF. For example, the AUSF 106 may retrieve the AV from the AV cache 160 and send the AV to the AMF 104. The method 300 may conclude at ending block 340. The method 300 may continue in FIG. 3B.

FIG. 3B is a flow chart of the method 300 for providing 5G-AKA UE authentication including evaluating an AV cache. The operations shown in FIG. 3B may be performed after the operations shown in FIG. 3A, or the operations shown in FIG. 3B may be performed without performing the operations shown in FIG. 3A. Thus, a standalone method may comprise the operations shown in FIG. 3B. The method 300 may resume at starting block 350 and proceed to operation 355, and an authentication request is received from the AMF. For example, the AMF 104 may send an authentication request to the AUSF 106.

In operation 360, it may be determined if an AV is present in the AV cache. For example, the AUSF 106 may request an AV from the AV cache 160, and the AV cache 160 may return a message that there is no AV if the AV cache 160 does not have the AV. If it is determined that the AV is present in the AV cache, method 300 may proceed to operation 365. In operation 365, the AV is fetched from the AV cache. For example, the AUSF 106 requests the AV from the AV cache 160, and the AV cache 160 returns the AV to the AUSF 106.

If it is determined that the AV is not present in the AV cache, method 300 may proceed to operation 370. In operation 370, the AV is requested from the UDM. For example, the AUSF 106 requests the AV from the UDM 108. In operation 375, the AV is received from the UDM. For example, the AUSF 106 may receive the AV from the UDM 108.

Once operation 365 or operation 375 is completed, the method 300 may proceed to operation 380. In operation 380, the AV is provided to the AMF. For example, the AUSF 106 provides the AV to the AMF 104.

In operation 385, a request for a new AV is queued. For example, the AUSF 106 instructs the AV request queue 150 to queue a request for a new AV for the associated subscriber. In some examples, multiple new AVs may be requested to populate the AV cache 160 with a desired or otherwise predetermined number of AVs. For example, the AV cache 160 may store five AVs for each subscriber. The AV cache 160 may have zero AVs associated with a subscriber, so the AUSF 106 may instruct the AV request queue 150 to queue five requests for a new AV for the associated subscriber in operation 385. The method 300 may conclude at ending block 390.

Figure 4:
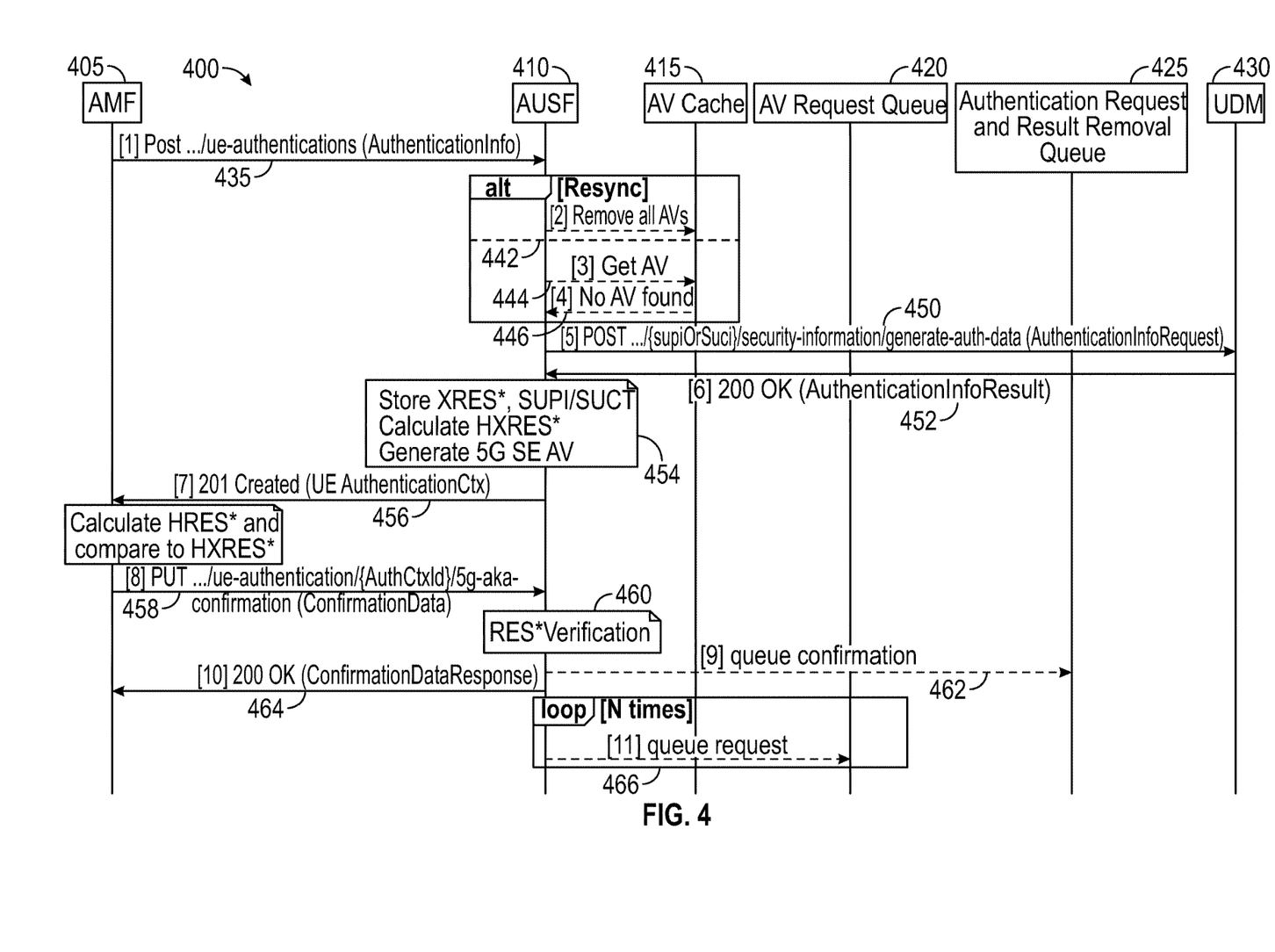
FIG. 4 is a signaling process for initial User Equipment authentication with an empty Authentication Vector cache or re-synchronization of the Authentication Vector cache.

FIG. 4 is a signaling process 400 for initial UE authentication with an empty AV cache or re-synchronization of the AV cache. The signaling process 400 may be between an AMF 405, an AUSF 410, an AV cache 415, an AV request queue 420, an authentication request and result removal queue 425, and a UDM 430. The signaling process 400 may begin in response to the AMF 405 initiating an authentication procedure in signal 435.

If the authentication procedure is a re-synchronization procedure, signal 442 may be performed. If the authentication procedure is not a re-synchronization procedure, signals 444 and 446 may be performed. In signal 442, the AUSF 410 may remove all AVs associated with the UE of the authentication request. In signal 444, the AUSF 410 may request an AV associated with the UE of the authentication request. In signal 446, the AV cache 415 may signal to the AUSF 410 that the AV cache has no AVs associated with the UE, which may indicate that the authentication procedure is an initial authentication for the UE.

In signal 450, the AUSF 410 may request the UDM 430 to generate an AV for the UE. The UDM may return the generated AV in signal 452. If the UDM 430 cannot be connected to, the AUSF 410 may send an error message to the AMF 405 because the AV cache 415 may not be populated and an AV cannot be returned to the AUSF 410.

In operation 454, the AUSF 410 may store an expected response (XRES*), store an identifier associated with the UE (e.g., IMSI, SUPI, SUCI), calculate a hash expected response (HXRES*), and/or generate a 5G Serving Environment AV (5G SE AV).

In signal 456, the AUSF 410 may send the AV to the AMF 405. In signal 458, the AMF 405 may send authentication confirmation data to the AUSF 410. In operation 460, the AUSF 410 may perform response (RES*) verification. The AUSF may add a request to the authentication confirmation and result removal queue 425 to confirm the successful authentication to the UDM 430 in signal 462. The request in the authentication confirmation and result removal queue 425 may be sent to the UDM 430 by the AUSF 410 when the edge, where the AUSF 410 may be located, can connect to the cloud where the UDM 430 may be located. In signal 464, the AUSF 410 may send a confirmation of the successful authentication, such as notifying the UDM 430 via the request in the authentication confirmation and result removal queue 425 that is subsequently sent to the UDM 430, such as by the AUSF 410. In signal 466, the AUSF 410 may send any number of AV requests to the AV request queue 420 for the associated UE. Therefore, when the AV request queue 420 subsequently sends the queued AV requests to the UDM 430 when the UDM 430 may be connected to, the UDM 430 may then send an AV to the AUSF 410 in response to each AV request. Thus, the AUSF 410 may cause the received AVs to be cached by the AV cache 415, and the UE will have associated AVs stored in the AV cache 415.

Figure 5:
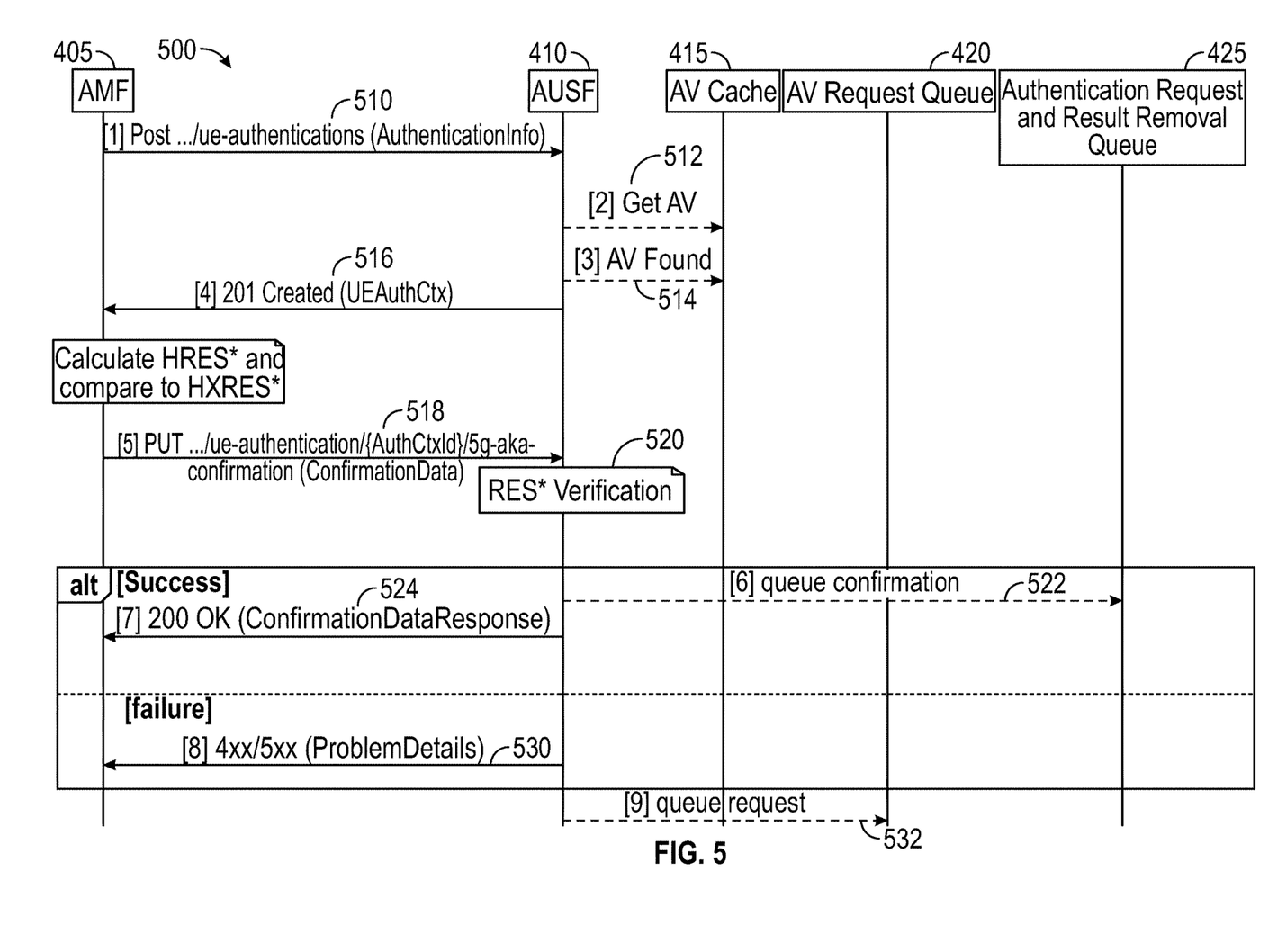
FIG. 5 is a signaling process for User Equipment authentication with a populated Authentication Vector cache.

FIG. 5 is a signaling process 500 for UE authentication with a populated AV cache 415. Thus, the signaling process 400 may occur before the signaling process 500, resulting in the AV cache 415 being populated with AVs. The signaling process 500 may be between the AMF 405, the AUSF 410, the AV cache 415, the AV request queue 420, and the authentication request and result removal queue 425.

The signaling process 500 may begin with signal 510, and the AMF 405 may send an authentication request to the AUSF 410. In signal 510, the AUSF may request from the AV cache 415 an AV to respond to the authentication request. The requested AV may be the first AV in the FIFO queue for the UE associated with the authentication request.

In signal 514, the AV cache 415 may return the requested AV to the AUSF 410. The AUSF may then send the AV to the AMF 405 in signal 516. In operation 517, the AMF 405 may determine a Hash Response (HRES*) and compare the HRES* to an associated HXRES*. In signal 518, the AMF 405 may send authentication confirmation data to the AUSF 410. The AUSF 410 may perform RES* verification in operation 520.

If the authentication is successful, signals 522 and 524 may be performed. If the authentication is not successful, signal 530 may occur. In signal 522, the AUSF 410 may send a successful authentication message to the authentication request and result removal queue 425 to be queued. The message in the authentication request and result removal queue 425 may be subsequently sent to the UDM 430, by the AUSF 410 for example. In signal 524, the AUSF 410 may send a message to the AMF 405 confirming the successful authentication. In signal 530, the AUSF 410 may send a message to the AMF 405 indicating that authentication was not successful. The message may include details regarding why the authentication was not successful.

In signal 532, the AUSF 410 may send an AV request to the AV request queue 420. The AV request may be sent to the UDM 430 by the AUSF 410 when it is possible to connect to the UDM 430, and the UDM 430 may send a new AV. Therefore, the AV cache 415 may add the new AV to have the same number of AVs in the FIFO queue associated with the UE before the AV was sent to the AMF 405 in signal 516.

Figure 6:
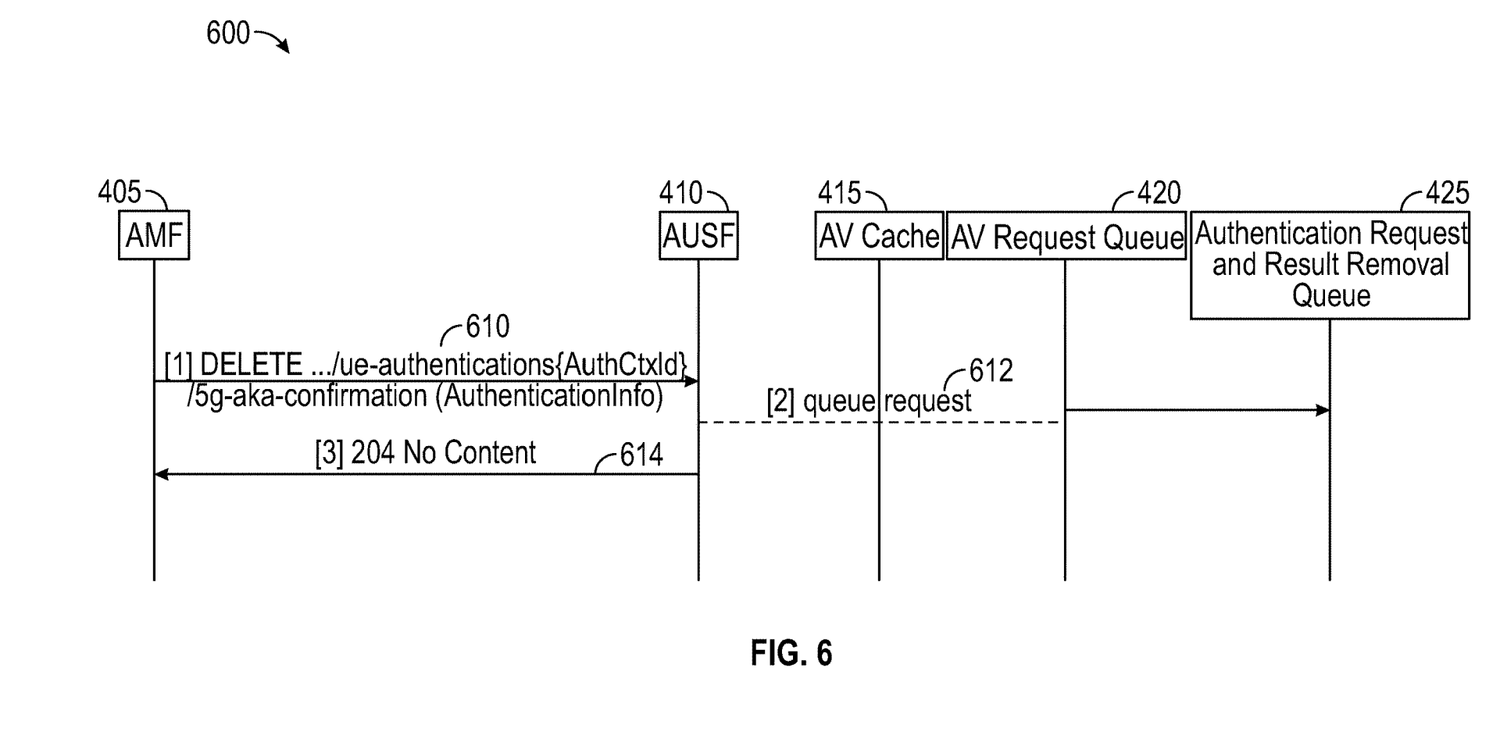
FIG. 6 is a signaling process for User Equipment authentication result removal.

FIG. 6 is a signaling process 600 for UE authentication result removal. For example, a UE authentication result removal may be performed in response to a UE deregistering with the network. The signaling process 600 may be between the AMF 405, the AUSF 410, and the authentication request and result removal queue 425. The signaling process 600 may begin with signal 610, and the AMF 405 may send a message requesting an authentication result removal procedure to the AUSF 410. In signal 612, the AUSF 410 may send a request to remove authentication results to the authentication request and result removal queue 425 to be queued. The request may be subsequently sent to the UDM 430 to perform the authentication result removal. In signal 614, the AUSF 410 may send the result of the authentication result removal to the AMF 405.

Figure 7:
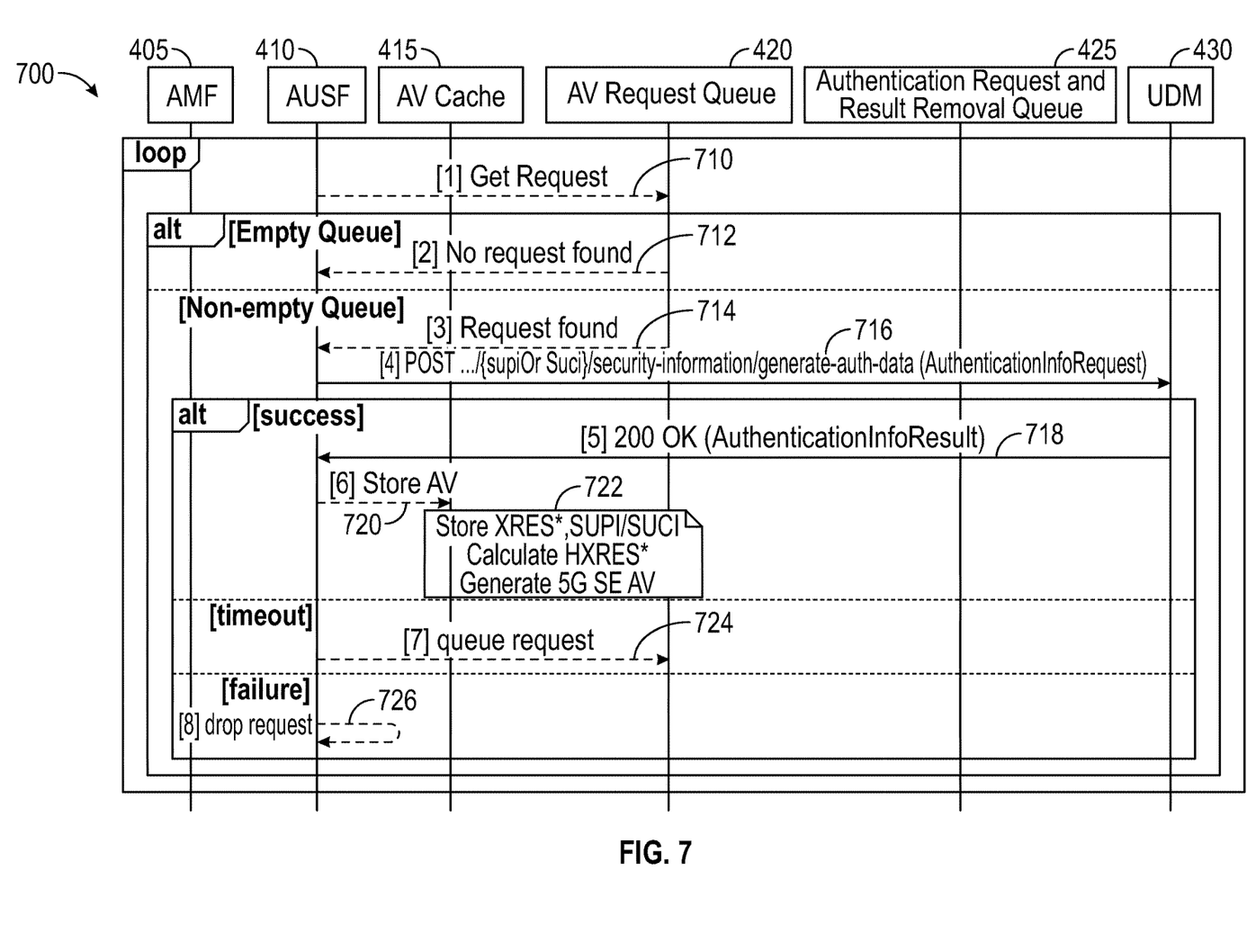
FIG. 7 is a signaling process for populating an Authentication Vector cache.

FIG. 7 is a signaling process 700 for populating an AV cache. The signaling process 700 may be between the AMF 405, the AUSF 410, the AV cache 415, the AV request queue 420, the authentication request and result removal queue 425, and the UDM 430.

The signaling process 700 may begin with signal 710, and the AUSF may request the AV request that is next in the queue from the AV request queue 420. If there are no queued requests in the AV request queue, signal 712 may be performed, and the AV request queue 420 may notify the AUSF 410 that there are no queued AV request to be sent to the UDM 430. If there are queued requests, the signaling process may proceed to signal 714. In signal 714, the AV request queue 420, may remove the AV request from the queue and send the AV request to the AUSF 410. In signal 716, the AUSF 410 may attempt to send the AV request to the UDM 430.

If the AV request is successfully sent to the UDM 430, signals 718 and 720 and operation 722 may be performed. In signal 718, the UDM 430 may send an AV to the AUSF 410 in response to the AV request. In signal 720, the AUSF 410 may cause the received AV to be stored in the AV cache 415. In operation 722, the AUSF 410 may store an XRES*, store an identifier associated with the UE (e.g., IMSI, SUPI, SUCI), calculate a HXRES*, and/or generate a 5G SE AV.

If sending the AV request to the UDM 430 and/or receiving a response from the UDM 430 times out, signal 724 may be performed. In signal 724, the AV request may be sent to the AV request queue 420 to be re-queued. The AV request may be inserted into the queue based on the priority that was previously determined when it was initially added to the queue or inserted into the queue based on evaluating the current state of the AV cache 415. For example, the present AV request may be for a UE that still has three associated AVs stored in the AV cache 415 and another UE that has an AV request queued may presently only have one associated AV in the AV cache 415. Thus, the AV request for the UE may be inserted behind an AV request associated with UE with only one stored AV request even though the initial priority of the AV request would have caused it to be inserted ahead of the AV request associated with the UE with one stored AV.

If sending the AV request to the UDM 430 fails, signal 726 may be performed. In signal 726, the AV request may be dropped, and an alert may be triggered by the AUSF 410. The AV request may be dropped because the AV request may never be successfully sent to the UDM 430. The AUSF 410 may determine why the AV request failed and include the determination in the alert.

The signaling process 700 may be repeated performed to continuously clear the AV request queue 420 and send the AV requests to the UDM 430.

Figure 8:
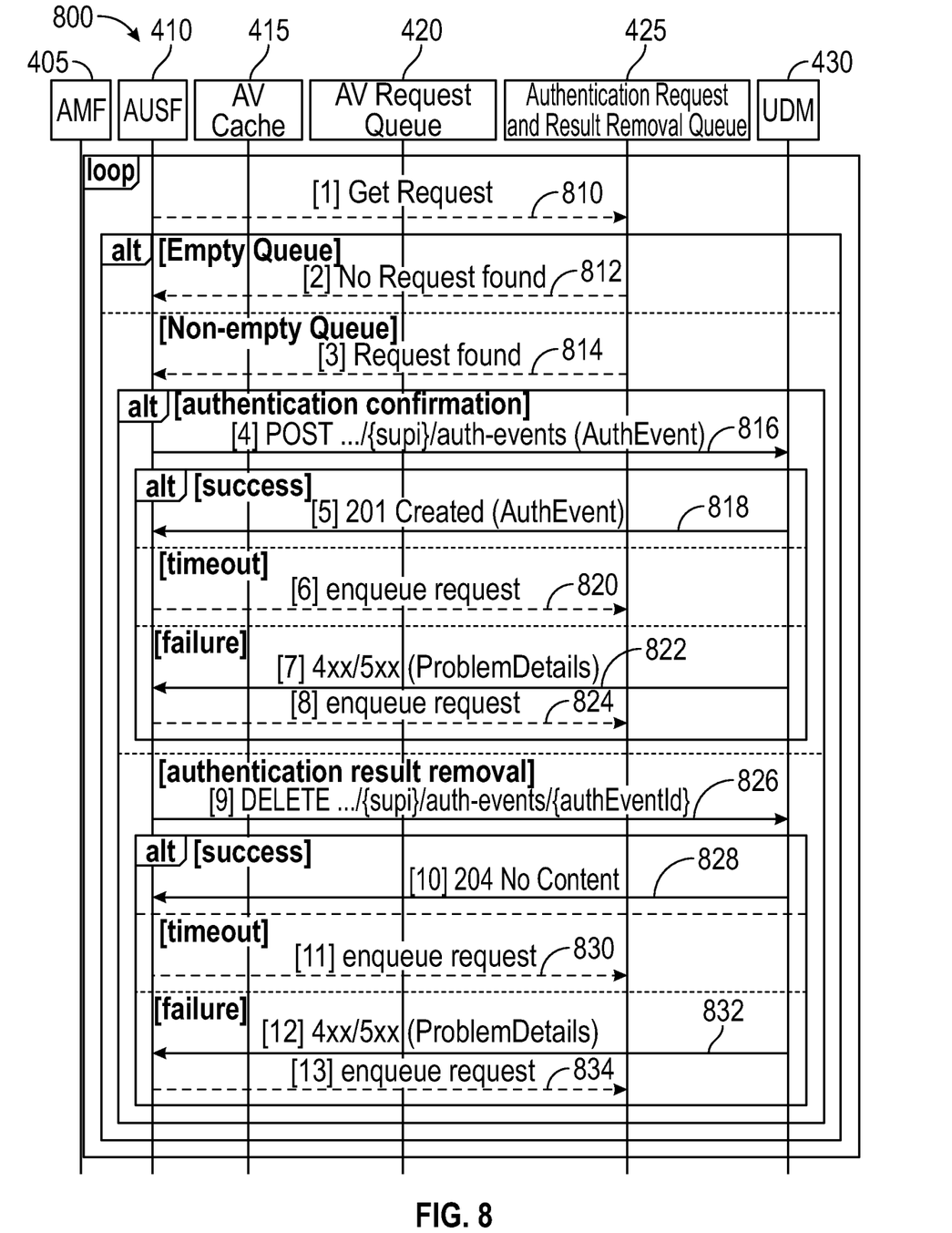
FIG. 8 is a signaling process for authentication confirmation and for authentication result removal.

FIG. 8 is a signaling process 800 for authentication confirmation and for authentication result removal. The signaling process 800 may be between the AUSF 410, the authentication request and result removal queue 425, and the UDM 430. The signaling process may begin in signal 810, and the AUSF 410 may request the next queued authentication confirmation or authentication result removal from the authentication request and result removal queue 425. If the authentication request and result removal queue 425 does not have any queued authentication confirmations or result removals, signal 812 may be performed. In signal 812, the authentication request and result removal queue 425 may send a message to the AUSF 410 indicating that there are no queued authentication confirmations or result removals.

If the authentication request and result removal queue 425 is not empty, signal 814 may be performed. In signal 814, the authentication request and result removal queue 425 may send the queued authentication confirmation or result removal to the AUSF 410.

If the AUSF 410 receives an authentication confirmation, the signaling process may proceed to signal 816. In signal 816, the AUSF 410 may send the authentication confirmation to the UDM 430. If the authentication is successfully sent to the UDM 430, signal 818 may be performed, and the UDM 430 may send a confirmation of the authentication confirmation success to the AUSF 410.

If sending the authentication confirmation and/or receiving a response from the UDM 430 times out in signal 816, signal 820 may be performed, and the AUSF 410 may send the authentication confirmation to the authentication request and result removal queue 425 to be re-queued. The authentication confirmation may be inserted into the authentication request and result removal queue 425 based on the priority determined when the authentication confirmation was initially added to the authentication request and result removal queue 425.

If sending the authentication confirmation fails or the UDM 430 cannot process the authentication confirmation, signals 822 and 824 may be performed. In signal 822, the UDM 430 may send a message detailing the reasons for the failure to the AUSF 410. In signal 824, the AUSF 410 may drop the request.

If AUSF 410 receives a result removal in signal 814, the signaling process may proceed to signal 826. In signal 826, the AUSF 410 may attempt to send the result removal to the UDM 430. If the result removal is successfully sent to the UDM 430, signal 828 may be performed. In signal 828, the UDM 430 may send a confirmation of the result removal to the AUSF 410.

If sending the result removal to the UDM 430 and/or receiving a response from the UDM 430 times out, signal 830 may be performed. In signal 830, the result removal may be sent to the authentication request and result removal queue 425 to be re-queued. The result removal may be inserted into the authentication request and result removal queue 425 based on the priority determined when the result removal was initially added to the authentication request and result removal queue 425.

If sending the result removal to the UDM 430, and/or the UDM 430 cannot process the result removal, signals 832 and 834 may be performed. In signal 832, the UDM 422 may send a message detailing the reasons for the failure to the AUSF 410. In signal 834, the AUSF 410 may drop the request.

Figure 9:
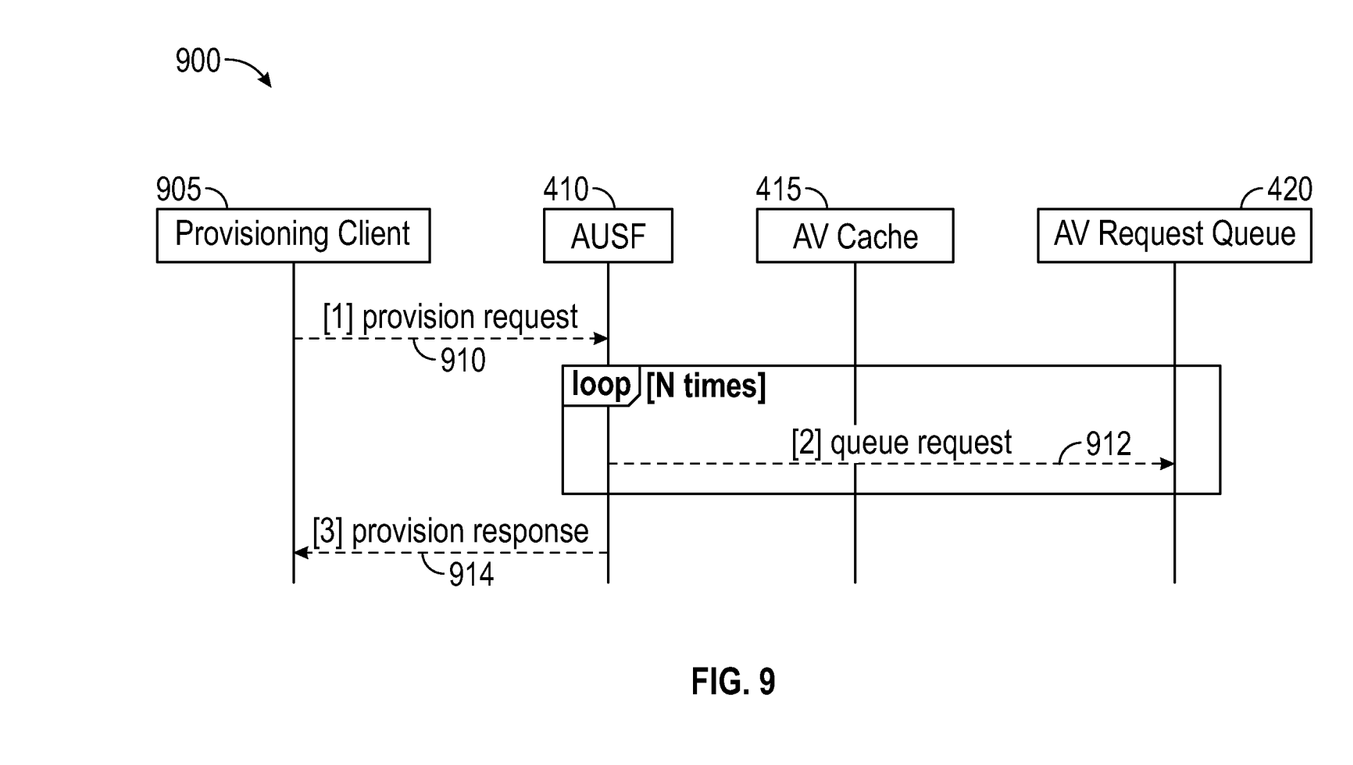
FIG. 9 is a signaling process for pre-population of an Authentication Vector cache.

FIG. 9 is a signaling process 900 for pre-population of the AV cache 415. The signaling process 900 may be between a provisioning client 905, the AUSF 410, and the AV request queue 420. The provisioning client 905 may initiate causing the AV cache 415 to be pre-populated for one or more UEs to ensure 5G-AKA UE authentication can be performed even when the edge cannot connect to the cloud.

The signaling process 900 may begin with signal 910, and the provisioning client 905 may send to the AUSF 410 a provisioning request to provision a subscriber of the network, such as an IMSI. In signal 912, the AUSF 410 may send one or more AV requests to the AV request queue 420 to be queued by the AV request queue 420. The signaling process 700 may be performed to populate the AV cache 415 with AVs associated with the subscriber. In signal 914, the AUSF 410 sends a message to the provisioning client 905 indicating that the provisioning is being performed.

Figure 10:
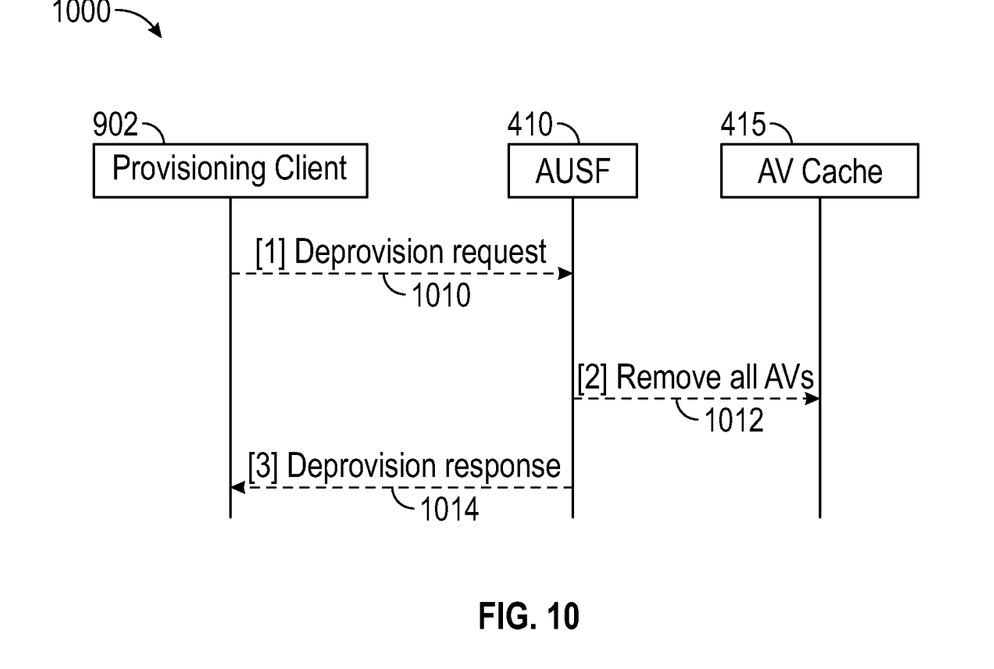
FIG. 10 is a signaling process for de-provisioning an Authentication Vector cache.

FIG. 10 is a signaling process 1000 for de-provisioning an AV cache. The signaling process 1000 may be between the provisioning client 905, the AUSF 410, and the AV cache 415. In signal 1010, the provisioning client 905 sends a de-provisioning request for a subscriber to the AUSF 410.

In signal 1012, the AUSF 410 instructs the AV cache 415 to remove all AVs associated with the subscriber. In signal 1014, the AUSF 410 sends a message to the provisioning client 905 indicating that the de-provisioning is being performed.

Figure 11:
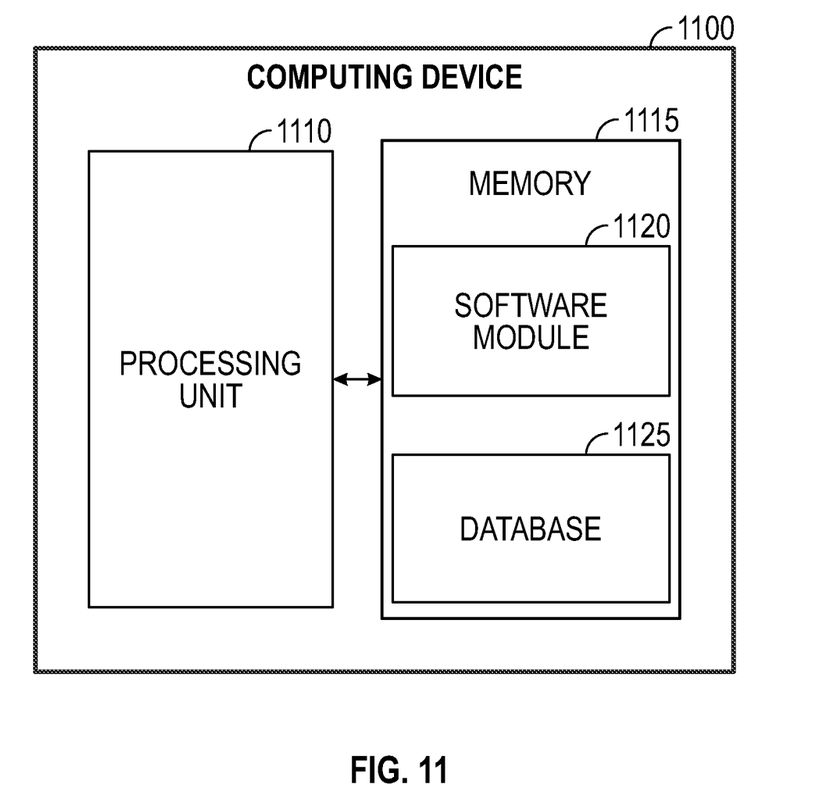
FIG. 11 is a block diagram of a computing device.

FIG. 11 is a block diagram of a computing device. As shown in FIG. 11, computing device 1100 may include a processing unit 1110 and a memory unit 1115. Memory unit 1115 may include a software module 1120 and a database 1125. While executing on processing unit 1110, software module 1120 may perform, for example, processes for providing 5G-AKA UE authentication as described above with respect to FIG. 1, FIG. 2, FIG. 3A, FIG. 3B, FIG. 4, FIG. 5, FIG. 6, FIG. 7, FIG. 8, FIG. 9, and FIG. Computing device 1100, for example, may provide an operating environment for the UE 102, the AMF 104, AUSF 106, the UDM 108, the UDR 110, the RAN 120, the UPF 122, the DN 124, the SMF 126, the CHF 128, the AV request queue 150, the authentication confirmation and result removal queue 155, the AV cache 160, the AMF 405, the AUSF 410, the AV cache 415, the AV request queue 420, the authentication confirmation and result removal queue 425, the UDM 430, the provisioning client 905, and/or any other system described herein. The UE 102, the AMF 104, AUSF 106, the UDM 108, the UDR 110, the RAN 120, the UPF 122, the DN 124, the SMF 126, the CHF 128, the AV request queue 150, the authentication confirmation and result removal queue 155, the AV cache 160, the AMF 405, the AUSF 410, the AV cache 415, the AV request queue 420, the authentication confirmation and result removal queue 425, the UDM 430, the provisioning client 905, and/or any other system described herein may operate in other environments and are not limited to computing device 1100.

Computing device 1100 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 1100 may comprise any computer operating environment, such as hand-held devices, multiprocessor systems, microprocessor-based or programmable sender electronic devices, minicomputers, mainframe computers, and the like. Computing device 1100 may also be practiced in distributed computing environments where tasks are performed by remote processing devices. The aforementioned systems and devices are examples, and computing device 1100 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 1100 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
executing an Authentication Server Function (AUSF) at an edge of a network;
requesting, by the AUSF, an Authentication Vector (AV) from a Unified Data Management (UDM);
receiving the AV from the UDM;
caching the AV at an AV cache;
receiving an authentication request from an Access and Mobility Management Function (AMF);
providing the AV from the AV cache to the AMF; and
determining the UDM is inaccessible, wherein providing the AV from the AV cache to the AMF is in response to determining the UDM is inaccessible.

2. The method of claim 1, further comprising:
requesting, by the AUSF, a second AV from the UDM;
receiving the second AV from the UDM; and
caching the second AV at the AV cache.

3. The method of claim 2, further comprising receiving an AV request from an AV request queue, wherein requesting the second AV from the UDM is in response to receiving the AV request.

4. The method of claim 1, further comprising:
receiving a request from the AMF to perform a re-synchronization procedure associated with a subscriber;
instructing the AV cache to remove a cached AV associated with the subscriber;
requesting a second AV associated with the subscriber from the UDM;
receiving the second AV; and
caching the second AV at the AV cache.

5. The method of claim 1, further comprising:
receiving an authentication confirmation from the AMF;
sending the authentication confirmation to the UDM; and
receiving a confirmation of authentication confirmation success from the UDM.

6. The method of claim 5, further comprising:
sending the authentication confirmation to an authentication confirmation and result removal queue; and
receiving the authentication confirmation from the authentication confirmation and result removal queue, wherein sending the authentication confirmation to the UDM is in response to receiving the authentication confirmation from the authentication confirmation and result removal queue.

7. A system comprising:
a memory storage; and
a processing unit coupled to the memory storage, wherein the processing unit is operative to:
executing an Authentication Server Function (AUSF) at an edge of a network;
cause the AUSF to request an Authentication Vector (AV) from a Unified Data Management (UDM);
receive the AV from the UDM;
cache the AV at an AV cache;
receive an authentication request from an Access and Mobility Management Function (AMF);
provide the AV from the AV cache to the AMF;
receive an authentication confirmation from the AMF;
send the authentication confirmation to the UDM;
receive a confirmation of authentication confirmation success from the UDM;
send the authentication confirmation to an authentication confirmation and result removal queue; and
receive the authentication confirmation from the authentication confirmation and result removal queue, wherein to send the authentication confirmation to the UDM is in response to receiving the authentication confirmation from the authentication confirmation and result removal queue.

8. The system of claim 7, wherein the processing unit is further operative to, determine the UDM is inaccessible, wherein to provide the AV from the AV cache to the AMF is in response to determining the UDM is inaccessible.

9. The system of claim 7, wherein the processing unit is further operative to,
cause the AUSF to request a second AV from the UDM;
receive the second AV from the UDM; and
cache the second AV at the AV cache.

10. The system of claim 9, wherein the processing unit is further operative to, receive an AV request from an AV request queue, wherein to request the second AV from the UDM is in response to receiving the AV request.

11. The system of claim 7, wherein the processing unit is further operative to, receive a request from the AMF to perform a re-synchronization procedure associated with a subscriber;
instruct the AV cache to remove a cached AV associated with the subscriber;
request a second AV associated with the subscriber from the UDM;
receive the second AV; and
cache the second AV at the AV cache.

12. A computer-readable medium that stores a set of instructions which when executed perform a method executed by the set of instructions comprising:
executing an Authentication Server Function (AUSF) at an edge of a network;
requesting, by the AUSF, an Authentication Vector (AV) from a Unified Data Management (UDM);
receiving the AV from the UDM;
caching the AV at an AV cache;
receiving an authentication request from an Access and Mobility Management Function (AMF);
providing the AV from the AV cache to the AMF;
requesting, by the AUSF, a second AV from the UDM;
receiving the second AV from the UDM;
caching the second AV at the AV cache; and
receiving an AV request from an AV request queue, wherein requesting the second AV from the UDM is in response to receiving the AV request.

13. The computer-readable medium of claim 12, further comprising determining the UDM is inaccessible, wherein providing the AV from the AV cache to the AMF is in response to determining the UDM is inaccessible.

14. The computer-readable medium of claim 12, further comprising:
receiving an authentication confirmation from the AMF;
sending the authentication confirmation to the UDM; and
receiving a confirmation of authentication confirmation success from the UDM.

15. The computer-readable medium of claim 12, further comprising:
receiving a request from the AMF to perform a re-synchronization procedure associated with a subscriber;
instructing the AV cache to remove a cached AV associated with the subscriber;
requesting a second AV associated with the subscriber from the UDM;
receiving the second AV; and
caching the second AV at the AV cache.

* * * * *